United States Patent [19]

Brandt et al.

[11] Patent Number: 5,565,102
[45] Date of Patent: Oct. 15, 1996

[54] PROCESS FOR PURIFYING ORGANIC SYNTHESIS PRODUCTS

[75] Inventors: Horst Brandt, Odenthal; Karlheinz Hildenbrand, Krefeld; Dietrich Tegtmeyer; Ralf Friedricsen, both of Bergisch Gladbach; Wolfgang Zarges, Köln, all of Germany

[73] Assignee: Bayer Aktiengesellschaft, Leverkusen, Germany

[21] Appl. No.: 333,385

[22] Filed: Nov. 2, 1994

[30]     Foreign Application Priority Data

Nov. 9, 1993 [DE] Germany .................. 43 38 196.0

[51] Int. Cl.$^6$ ............................................ B01D 61/14
[52] U.S. Cl. ............................ 210/500.28; 210/651
[58] Field of Search .................. 210/651, 652, 210/654, 500.27, 500.28

[56]               References Cited

U.S. PATENT DOCUMENTS

| | | |
|---|---|---|
| 4,045,337 | 8/1977 | Knickel et al. . |
| 4,262,041 | 4/1981 | Eguchi et al. .................. 210/506 X |
| 4,851,011 | 7/1989 | Lacroix et al. . |

FOREIGN PATENT DOCUMENTS

| | | |
|---|---|---|
| 0077509 | 4/1983 | European Pat. Off. . |
| 0287515 | 10/1988 | European Pat. Off. . |
| 2276343 | 1/1976 | France . |

OTHER PUBLICATIONS

Derwent Abstracts, Week 7951/8348, 79–91701B, JP780053184 May 1, 1978; "Microporous permeable membrane of polyurea . . . ", Nitto Electric Ind. KK; 1 page.
Derwent Abstracts, p. 8, FARB D15 42015 K/18, J58079505; "Semipermeable membrane not shrinking irrersibly on . . . ", Bayer AG, Oct. 21, 1981.

*Primary Examiner*—Frank Spear
*Attorney, Agent, or Firm*—Sprung Horn Kramer & Woods

[57]                ABSTRACT

The novel process for working up solutions or suspensions of organic synthesis products having a pH value of <3, preferably <1, is carried out with the aid of an asymmetrical, semipermeable membrane composed of cyclic polyureas with repeating structural units of the formula (I)

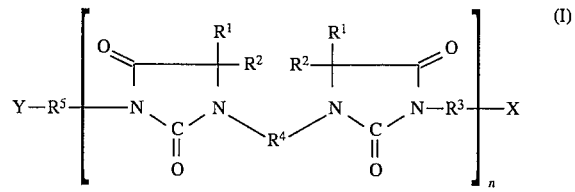

wherein the substituents $R^1$, $R^2$, $R^3$, $R^4$, $R^5$, X and Y and the index n are each as defined in the description.

10 Claims, No Drawings

PROCESS FOR PURIFYING ORGANIC SYNTHESIS PRODUCTS

The present invention relates to a process for purifying and/or concentrating strongly acid solutions or suspensions of organic synthesis products using a semipermeable membrane.

There already exist a multiplicity of processes for working up dye solutions or suspensions with the aid of membranes. The solutions or suspensions used in the prior art are aqueous, neutral or at most weakly acid to alkaline solutions or suspensions. The membranes used consist of polymers or copolymers in various combinations and physical structures as asymmetrical membranes or in composite form, in some instances with additionally introduced ionic groups on support materials composed of polyester, polyamide or polyolefins.

Because of the membrane materials used, the processes mentioned are suitable for working up aqueous solutions having pH values from 3 to 10.

EP 0 287 515 discloses a process for desalting and concentrating crude dye solutions having pH values from 3 to 10 by means of a combination of membrane process and cross-flow microfiltration.

Strongly acid solutions or suspensions having pH values <3 can lead to impairment of the membrane materials used, through hydrolysis.

It is an object of the present invention to provide a process for purifying strongly acid solutions or suspensions of organic synthesis products having pH values <3 through removal of by-products and inorganic salts and/or concentrating by means of a semipermeable membrane.

It has surprisingly been found that semipermeable membranes composed of cyclic polyureas make it possible to purify and/or concentrate strongly acid solutions or suspensions having pH values <3.

The present invention accordingly provides a process for purifying and/or concentrating solutions or suspensions of organic synthesis products having a pH value of <3, preferably <1, which is characterized in that the purifying and/or concentrating is carried out with the aid of an asymmetrical semipermeable membrane composed of cyclic polyureas with repeating structural units of formula (I)

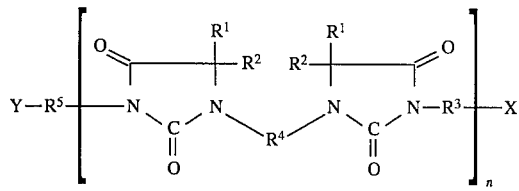

where $R^1$ and $R^2$ are each independently of the other hydrogen, $C_1$–$C_6$-alkyl, or together with the carbon atom in position 5 a cycloalkyl radical having 5 to 10 carbon atoms, $R^3$ and $R^4$ are each independently of the other $C_1$–$C_{12}$-alkylene, $C_3$–$C_6$-cycloalkylene or arylene, which radicals may be bonded once more to themselves or to another recited radical, via bridge members, and may contain ether, ester and amide groups, $R^5$ is a bond or a radical $R^3$ or $R^4$, X and Y are each a bond or independently of each other the group

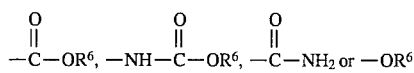

where $R^6$ is aryl, $C_1$–$C_{12}$-alkyl, $C_1$–$C_{12}$-hydroxyalkyl or $C_1$–$C_{12}$-alkoxyalkyl, and n is from 2 to 200.

Preferably the cyclic polyureas have repeating structural units of the formula (I)

where $R^1$ and $R^2$ are each independently of the other hydrogen or $C_1$–$C_4$-alkyl, $R^3$ and $R^4$ are each independently of the other $C_1$–$C_6$-alkylene, $C_3$–$C_6$-cycloalkylene or phenylene, which radicals may be bonded once more to themselves and may contain ether, ester and amide groups, $R^5$ is a bond or a radical $R^3$ or $R^4$, X and Y are each independently of the other a group

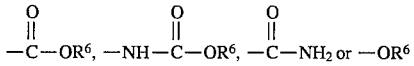

where $R^6$ is phenyl, $C_1$–$C_6$-alkyl, $C_1$–$C_6$-hydroxyalkyl or $C_1$–$C_6$-alkoxyalkyl, and n is from 50 to 200.

Semipermeable membranes composed of cyclic polyureas with repeating structural units of the formula (I) are already known from DE-C-2 431 071 and can be prepared by the process described there. There they are used as asymmetrical membranes in reverse osmosis for desalting strongly acid solutions having pH values between 0 and 4.

In the practice of the process according to the invention, the membranes to be used according to the invention can in principle be operated as part of different membrane processes. Especially suitable are those membrane processes which operate by means of a concentration gradient, an electric field or an applied pressure. Preferably the membrane processes suitable for the process of the invention are pressure-driven processes such as reverse osmosis, ultrafiltration or nanofiltration.

The process of the invention is suitable in particular for purifying and/or concentrating sulphuric acid solutions or suspensions or organic synthesis products having sulphuric acid concentrations from 2 to 30%, preferably from 10 to 30%. The temperature of the solution or suspension can be up to 80° C., preferably from 0° to 60° C., especially from 20° to 40° C. It is particularly advantageous to use the process of the invention for working up sulphuric acid solutions or suspensions of dyes to separate off in particular organic impurities such as, for example, unconverted starting compounds and inorganic salts and also sulphuric acid. The dye solutions or suspensions can be worked up with the process of the invention directly as sulphuric acid solutions or suspensions as obtained in the dye synthesis. Suitable dyes include in principle any dye classes, such as disperse dyes, metal complex dyes, direct dyes, dyes for wool, polyamide and leather and also reactive dyes and also all kinds of optical brighteners.

Preferably the process of the invention is used for working up solutions or suspensions of reactive dyes.

Reactive dyes are dyes which have one or more reactive groups or detachable substituents which on application of the dyes to cellulose materials in the presence of acidbinding agents and with or without heating are capable of reaction with the hydroxyl groups of the cellulose, or on application to superpolyamide fibers, such as wool, with NH groups of these fibers, to form covalent bonds.

Specific examples are 2,4-difluoro-6-triazinyl, 2,4-dichloro-6-triazinyl, monohalo-sym-triazinyl radicals, in particular monochlorotriazinyl and monofluorotriazinyl radicals which are substituted by alkyl, aryl, amino, monoalkylamino, dialkylamino, aralkylamino, arylamino, morpholino, piperidino, pyrrolidino, piperazino, alkoxy, aryloxy, alkylthio, arylthio, wherein alkyl is preferably optionally substituted $C_1$–$C_4$-alkyl, aralkyl is preferably optionally substituted phenyl-$C_1$–$C_4$-alkyl and aryl is preferably optionally substituted phenyl or naphthyl and wherein preferred substituents for alkyl are halogen, hydroxyl, cyano, vinylsulphonyl, substituted alkylsulphonyl, dialkylamino, morpholino, $C_1$–$C_4$-alkoxy, vinyl-sulphonyl-$C_2$–$C_4$-alkoxy, substituted alkylsulphonyl-$C_2$–$C_4$-alkoxy, carboxyl, sulpho or sulphato and for phenyl and naphthyl are sulpho, $C_1$–$C_4$-alkyl, $C_1$–$C_4$-alkoxy, carboxyl, halogen, acylamino, vinylsulphonyl, substituted alkylsulphonyl, hydroxyl, amino.

To carry out the process of the invention the semipermeable membranes are preferably used in combination with a microporous support material composed of polyphenylene sulphide which serves as a base for the polymer layer.

The semipermeable membranes on a microporous polyphenylene sulphide support to be used according to the invention are particularly suitable for use as ultrafiltration membranes, in which use they give very good retention of molecular weights up to 500 g mol$^{-1}$ and are readily permeable for anions or cations below this limit. The membranes on polyphenylene sulphide supports can be constructed as flat, wound or tubular membranes.

Semipermeable membranes consisting of a microporous support layer of polyphenylene sulphide and an asymmetrical membrane layer of cyclic polyureas with repeating structural units of the formula

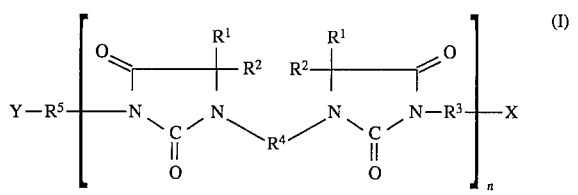

where $R^1$ and $R^2$ are each independently of the other hydrogen, $C_1$–$C_6$-alkyl, or together with the carbon atom in position 5 a cycloalkyl radical having 5 to 10 carbon atoms, $R^3$ and $R^4$ are each independently of the other $C_1$–$C_{12}$-alkylene, $C_3$–$C_6$-cycloalkylene or arylene, which radicals may be bonded once more to themselves or to another recited radical, via bridge members, and may contain ether, ester and amide groups, $R^5$ is a bond or a radical $R^3$ or $R^4$, and Y are each a bond or independently of each other the group

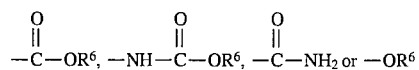

where $R^6$ is aryl, $C_1$–$C_{12}$-alkyl, $C_1$–$C_{12}$-hydroxyalkyl or $C_1$–$C_{12}$-alkoxyalkyl, and n is from 2 to 200, are new and likewise form part of the subject-matter of the present invention.

Semipermeable membranes composed of a microporous support layer, which can consist of polyester, polypropylene, polyethylene or polyamide, and an asymmetrical membrane layer, which can consist inter alia of a polycyclic urea, are already known from EP-A 0 077 509.

The membrane of the invention is produced in known manner (cf. for example DE-C-2 431 071) by casting a solution of the cyclic polyurea with repeating structural units of the formula (I) onto the polyphenylene sulphide support in layer thicknesses of for example 100 to 500 μm. The membranes of the invention are suitable for purifying and/or concentrating solutions or suspensions of organic synthesis products. The membranes of the invention are generally suitable for use within a wide pH range from for example 0 to 10. However, preference is given to the use in the acid pH range from 0 to 4, preferably <3, particularly preferably from 0 to 2 and especially <1. The membranes of the invention are suitable for all membrane processes already mentioned above for the process of the invention and can be used in the form of any customary module design.

They are particularly suitable for use as ultrafiltration membranes for purifying and/or concentrating sulphuric acid dye solutions or suspensions having pH values of <3, preferably of <1, especially from 0 to 2, in particular for separating off sulphuric acid.

The membranes of the invention are particularly suitable for carrying out the process of the invention.

The membranes of the invention combine pH and thermal stability with good retention capacity with respect to hydrophilic molecules in strongly acid or else aqueous solutions having molecular weights from 400 to 3000 dalton. Particularly noteworthy are the achieved permeate flow densities in l/m$^2$.d of 13,000–20,000 l/m$^2$.d at 5 bar pressure.

The membranes of the invention are suitable for example as flat membranes, particularly as tubular membranes, for removing molecules having molecular weights of 500 dalton or greater from sulphuric acid solutions. The retention of these molecules is better than 99%. If the removed $H_2SO_4$-containing permeate is replaced by fully demineralized water, it is possible, after repeated water replacement, to lower the sulphate content to <1%.

But even with respect to aqueous solutions of comparable molecular sizes the retention is 95 to 99% at permeate flow densities between 500 and 15,000 l/m$^2$.d.

Production of a Membrane According to the Invention

Example A

A polymer with structural units of the formula

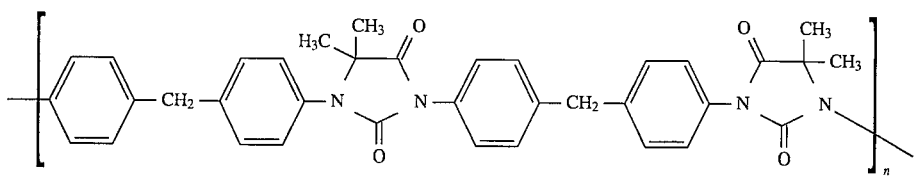

where n=20 to 120 is dissolved to 22% strength in N-methylpyrrolidone, filtered, degassed and applied in a coagulation apparatus to a polyphenylene sulphide nonwoven. The coated nonwoven is transferred into a waterbath, the polymer is coagulated at 20° C. and then preserved in 30% strength aqueous glycerol solution.

Use Examples

Example 1

31 kg of solution of the reactive dye

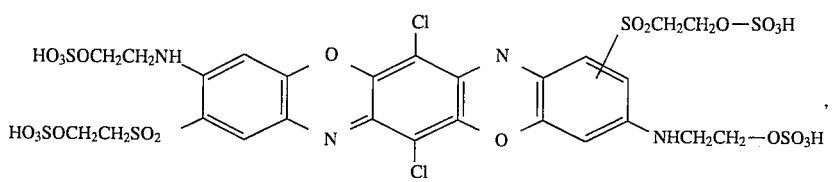

which contains 15% of sulphuric acid (pH about 0 to 1) is recirculated at 30 bar pressure and a flow rate of 1200 l/h over a tubular module of the membrane of Example A having an exchange area of 0.9 m². The dye retention is

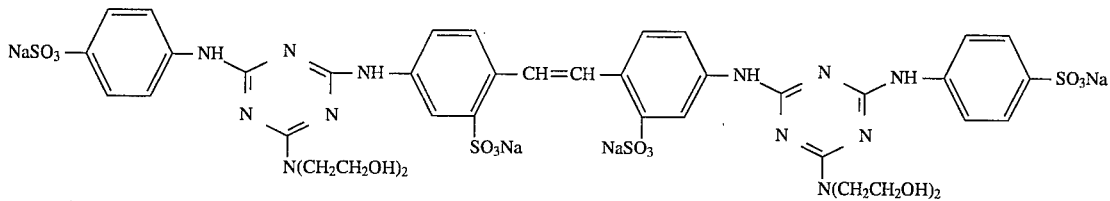

99.6%, the permeate flow density is on average 3900 l/m².d over the 6.5 hours' duration of the run. Over the duration of the run 4.2% of $SO_4^{2-}$ are removed consistent in the permeate and returned to the reservoir vessel.

Example 2

1 kg of solution of the reactive dye of Example 1 with a sulphuric acid content of 19% (pH about 0) are pumped at 30 bar and at a flow rate from 1100 to 1300 l/h through a tubular module of the membrane of Example A having an exchange area of 0.9 m².

The withdrawn permeate is replaced with demineralized water, in total up to 3 times the starting volume. The permeate flow density is 8000 l/m².d. The dye retention improves from an initial figure of 98.1% to 99.4% at the end. The sulphate content drops from the initial ~19% to 3%.

The remaining acid is neutralized with sodium hydroxide solution, adjusted with a dispersant prepared by condensation of naphthalenesulphonic acids and formaldehyde to about 40% dye, based on the dry content, and dried in a one-material nozzle dryer at 180° C. inlet and 80° C. outlet temperature.

Unlike the conventional isolation by salting out with KCl or KCl/NaCl, no dye is lost and the dilute acid can be worked back up.

Example 3

20 kg of solution of an optical brightener of the following formula with a pH value of about 7 are pumped at 1000 l/h and a pressure of 20 bar over a tubular module of a membrane of Example A having an exchange area of 0.9 m². During the concentrating by ⅓ of the volume the retention is 99.9%. Thereafter the permeate is replaced with fully demineralized water until about ⅓ of the volume has been exchanged, thereafter further permeate is withdrawn until the active ingredient content is about 30%, the solution is diluted with water to an active ingredient content of 26%. A stable solution is obtained not only at low temperatures (−20° C.) but also up to 40° C.

We claim:

1. A semipermeable membrane comprising a microporous support layer of polyphenylene sulphide and an asymmetrical membrane layer of cyclic polyureas with repeating structural units of the formula

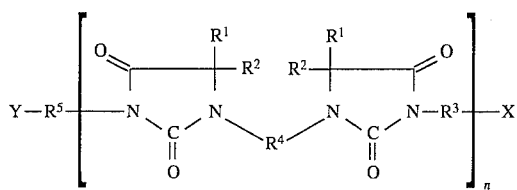

where $R^1$ and $R^2$ are each independently of the other hydrogen, $C_1$–$C_6$-alkyl, or together with the carbon atom in position 5 a cycloalkyl radical having 5 to 10 carbon atoms, $R^3$ and $R^4$ are each independently of the other $C_1$–$C_{12}$-alkylene, $C_3$–$C_6$-cycloalkylene or arylene, which radicals may be bonded once more to themselves or to another recited radical, via bridge members, and may contain ether, ester and amide groups, $R^5$ is a bond or a radical $R^3$ or $R^4$, X and Y are each a bond or independently of each other the group

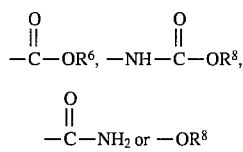

where $R^6$ is aryl, $C_1$–$C_{12}$-alkyl, $C_1$–$C_{12}$-hydroxyalkyl or $C_1$–$C_{12}$-alkoxyalkyl, and n is from 2 to 200.

2. Process for producing the membrane of claim 1, wherein a solution of a cyclic polyurea with repeating structural units of the formula (I) as set forth in claim 1 is cast onto a polyphenylene sulphide nonwoven in a layer thickness from 100 to 500 μm.

3. In a process for (A) removing organic impurities, inorganic salts and sulphuric acid from a sulphuric acid solution or suspension of organic synthesis products, (B) concentrating such solution or suspension, or both (A) and (B), wherein such solution or suspension at a pH of <3 is contacted with a semipermeable membrane, the improvement which comprises employing as said membrane a membrane according to claim 1.

4. Process according to claim 3, wherein the solution or suspension contains 2 to 30% of sulphuric acid and has a pH value from 0 to 2.

5. Process according to claim 3, wherein the solution or suspension has a temperature from 20° to 40° C.

6. Process according to claim 3, wherein the membrane is operated as an ultrafiltration or nanofiltration membrane.

7. Process according to claim 3, wherein the organic synthesis products are dyes or optical brighteners.

8. Process according to claim 3, wherein the organic synthesis products are reactive dyes.

9. A membrane according to claim 1, having a retention capacity with respect to hydrophilic molecules having molecular weights from 400 to 3,000 daltons.

10. In a process for (A) removing organic impurities, inorganic salts and sulphuric acid from a sulphuric acid solution or suspension of organic synthesis products, (B) concentrating such solution or suspension, or both (A) and (B), wherein such solution or suspension at a pH of <3 is contacted with a semipermeable membrane, the improvement which comprises employing as said membrane a membrane according to claim 9.

* * * * *

UNITED STATES PATENT AND TRADEMARK OFFICE
CERTIFICATE OF CORRECTION

PATENT NO. : 5,565,102
DATED : October 15, 1996
INVENTOR(S) : Brandt, et al.

It is certified that error appears in the above-indentified patent and that said Letters Patent is hereby corrected as shown below:

Title page, item: [75] Inventors: 4th Inventor delete
" Friedricsen " and substitute
-- Friedrichsen --

Signed and Sealed this

Twenty-fifth Day of March, 1997

Attest:

BRUCE LEHMAN

*Attesting Officer*     *Commissioner of Patents and Trademarks*